United States Patent [19]

Basilico

[11] 4,161,752
[45] Jul. 17, 1979

[54] HIGH DENSITY VIDEO DISK HAVING TWO PIT DEPTHS

[75] Inventor: Albert R. Basilico, Hyde Park, N.Y.

[73] Assignee: International Business Machines Corporation, Armonk, N.Y.

[21] Appl. No.: 810,702

[22] Filed: Jun. 28, 1977

[51] Int. Cl.² .................... H04N 5/76; G11B 23/18; G11B 7/24
[52] U.S. Cl. ................ 358/128; 179/100.3 V; 179/100.3 G; 365/124
[58] Field of Search .............. 365/120, 121, 124, 126, 365/127; 179/100.3 V, 100.41 L, 100.3 G, 100.3 K; 358/128, 129, 127; 250/578

[56] References Cited

U.S. PATENT DOCUMENTS

| | | | |
|---|---|---|---|
| 3,348,217 | 10/1967 | Snaper | 365/121 |
| 3,371,154 | 2/1968 | Frohbach et al. | 179/100.3 V |
| 3,379,095 | 4/1968 | Kaprelian | 179/100.3 K |
| 3,396,266 | 8/1968 | Max et al. | 365/121 |
| 3,503,050 | 3/1970 | Schouls et al. | 365/124 |
| 3,510,658 | 5/1970 | Rabedeau | 250/578 |
| 3,624,278 | 11/1971 | Heckscher | 358/127 |
| 3,703,724 | 11/1972 | Thomas | 179/100.3 G |
| 3,855,426 | 12/1974 | Bouwhuis | 179/100.3 V |
| 4,084,185 | 4/1978 | deLang et al. | 179/100.3 V |
| 4,085,423 | 4/1978 | Tsunoda et al. | 179/100.3 V |

FOREIGN PATENT DOCUMENTS 714365 8/1954 United Kingdom ............ 179/100.3 V

*Primary Examiner*—Raymond F. Cardillo, Jr.
*Attorney, Agent, or Firm*—William S. Robertson

[57] ABSTRACT

A video recording disk that is optically readable has data represented in a form that permits data track revolutions to be spaced close together without an intervening guardband or with only a narrow guardband. The track revolutions are in two sets that form a parallel spiral or alternating concentric circles so that a track revolution of one set is separated from other track revolutions of the same set by intervening track revolutions of the other set. Binary data is represented on the tracks by deformations or the absence of deformations, and the record is read as destructive interference in a light beam produced at the location of a deformation. Deformations of the first set of tracks have a depth that is appropriate to be read with a wavelength designated lambda 1, and deformations of the second set have a depth to be read by light of a wavelength lambda 2. Light that is reflected from an adjacent track does not have any significant data content, and the track revolutions can be located close together without producing significant interference in the signals.

6 Claims, 4 Drawing Figures

HIGH DENSITY VIDEO DISK HAVING TWO PIT DEPTHS

INTRODUCTION

An optically readable video recording disk has narrow, closely spaced, track revolutions that hold the storage positions for programming material that is to be displayed on a television set. It has been proposed to make the tracks about 1 micron wide and to separate the tracks by an intervening guardband about 1 micron wide so that there would be about 500 tracks per centimeter of usable radius of the disk. Conventionally, one track revolution contains the data for one television frame. In NTSC system, the picture is displayed at thirty frames per second (1800 frames per minute). Thus, a radial centimeter of the record would hold less than three minutes of television programming, and a video recording disk having the characteristics described so far and having a convenient size would not have sufficient storage capacity for many kinds of television programming material. A variety of approaches have been considered for increasing the storage density of a record, but it can be seen from this introduction that storage capacity could be increased quite significantly if the guardband is eliminated or substantially reduced in width.

A guardband separates two adjacent track revolutions so that the read head of the record player can be controlled by a servomechanism to follow a selected track. The tracks are not perfectly circular or spiral and the material of many records shrinks and stretches unevenly so that a track may differ from an ideal position by the width of many tracks. If the read head position shifts toward an adjacent track, the intended signal may be lost or may be distorted by the adjacent track signal or the record player may begin displaying the frame of the adjacent track. The guardband physically separates the tracks, and light from the guardband is used by the servomechanism for sensing the position of the read head.

THE PRIOR ART

In some video disks a recording is formed by modulating a carrier frequency with a signal that is to be stored and then forming record deformations or other marks along the record track to represent the modulated carrier.

The prior art has suggested storing data on adjacent track revolutions at two different frequencies. The optical sensing apparatus detects signals from the track revolution being read and it also picks up the corresponding signals from the adjacent tracks, and the sensing apparatus produces an electrical signal that contains the data for the track being read and may also contain data for either or both of the adjacent tracks. Electrical filter circuits separate the two carrier frequencies and the carrier for the track being read is further processed to form a television signal. In such a system, there are two parallel spiral tracks, and one track is played from outside to inside across the record and the record direction is then reversed and the other track is played from inside to outside. This system requires a carrier frequency and a high bandwidth and is not adaptable to a digital recording.

SUMMARY OF THE INVENTION

One object of this invention is to provide a new and improved video record that stores binary data without an intervening guardband (or with a significantly reduced guardband) and without a carrier frequency. The binary data representation can be further modulated in frequency or other conventional characteristics.

The record of this invention has two sets of track revolutions that are arranged in two parallel spirals (or alternating concentric circles) so that a track revolution of the first set lies between two track revolutions of the second set and visa versa. The tracks may be radially contiguous or they may be separated by a reduced guardband.

Digital data is represented by deformation such as pits along the tracks. A pit can be optically distinguished from the absence of a pit by the fact that light of a selected wavelength produces destructive interference when it is reflected from a pit and from the surface of the record or guardband in the neighborhood of the pit, as is known. Arbitrarily, a pit will be called a 1 bit and the absence of a pit will be called a 0 bit. Along the first set of tracks, the pits have a depth to be read by a light of a wavelength designated $lambda_1$ and along the tracks of set two the pits have a depth to be read by light of a wavelength that is designated $lambda_2$. The two wavelengths are selected so that light that is reflected from an adjacent 1 bit has very nearly the same phase as light reflected from an adjacent 0 bit, and an adjacent track does not contain any information that would interfere with the reading operation.

The following description of a preferred embodiment of the invention will suggest further objects, advantages and features of the invention.

THE DRAWINGS

THE RECORD AND PLAYER OF THE DRAWING

Figure 1:
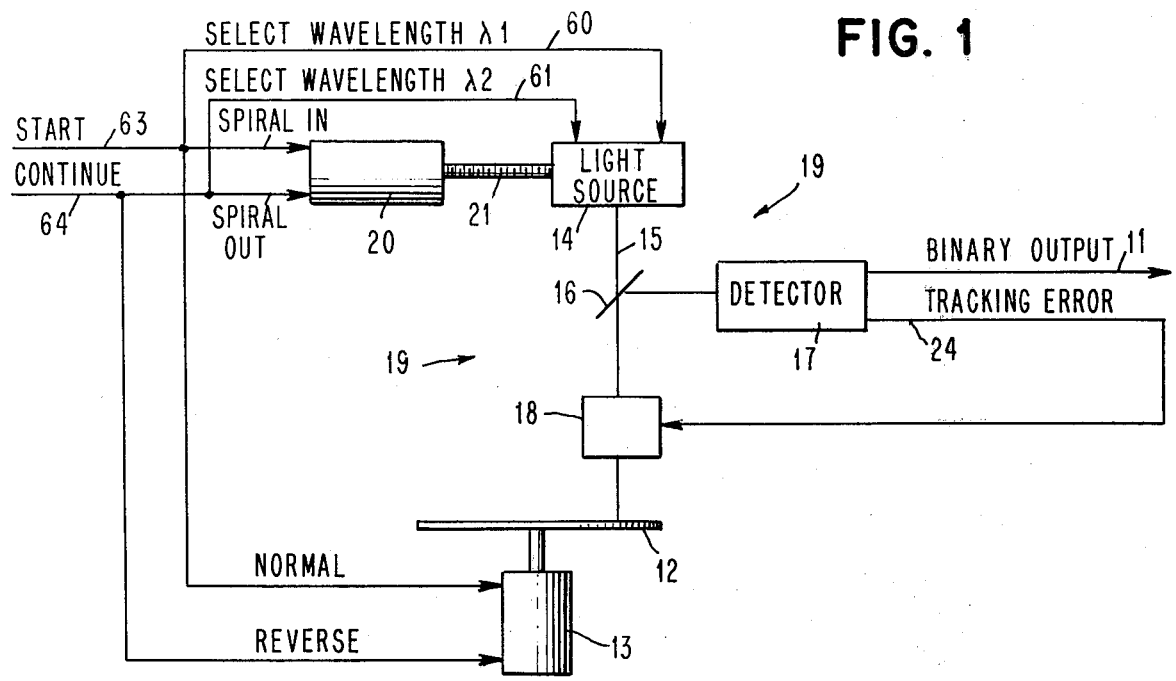
FIG. 1 is a schematic representation of the preferred record player of this invention.

FIG. 1—Conventional Features

FIG. 1 shows a digital video recording disk 12 and components of a record player that produce a binary valued output signal on a line 11. Conventional components that are not shown in the drawing operate on this output to produce a television display. Video disk 12 is driven by a motor 13. The storage position that is to be read on the disk is illuminated by a spot of light from a light source 14. The light beam from the light source follows a path that is represented by a line 15 that passes through a partial mirror 16 and an optical system 18. Light that is reflected from the illuminated spot on the record follows the path of line 15 through the optical system 18, to the partial mirror 16, and to a detector 17 where the image of the illuminated portion of the record is formed on a set of light sensitive diodes. The light source 14, detector 17, and optical system 18 are preferably combined as a unitary read head 19. A motor 20 and a lead screw 21 advance read head 19 along a radial line with respect to the disk to follow the track being read.

Detector 17 may have three light sensitive diodes located so that when the read head is correctly positioned the center one of the three diodes receives the image of the storage position being read and the two outer diodes receive the image of the area beside the data track. Conventionally the area beside the data track is a guardband and the two outer diodes produce a zero level differential output which appears on a line 24. As the reading position drifts away from the ideal position, the differential signal on line 24 corresponding varies in amplitude and polarity, and the signal on line 24 is used to make fine adjustments in the position of the read head.

The features of the record and the player that have been described in this introduction are conventional and they are representative of a wide range of components that can be used in the player of this invention. Other features of the player of FIG. 1 will be described after the following description of the record.

Figure 2:
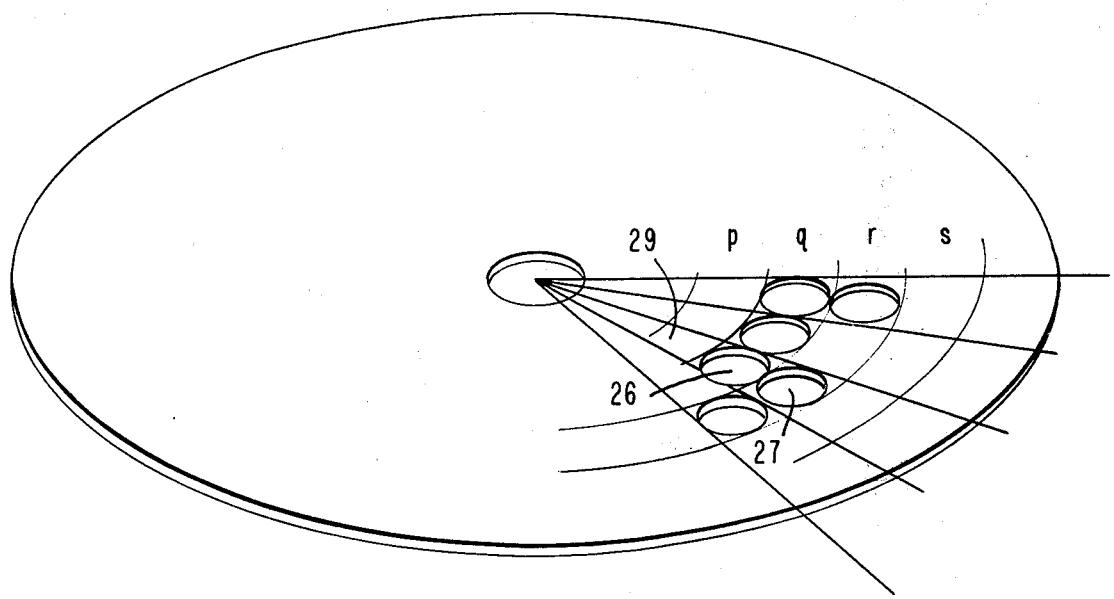
FIG. 2 is an isometric view of the digital data record of this invention.
Figure 3:
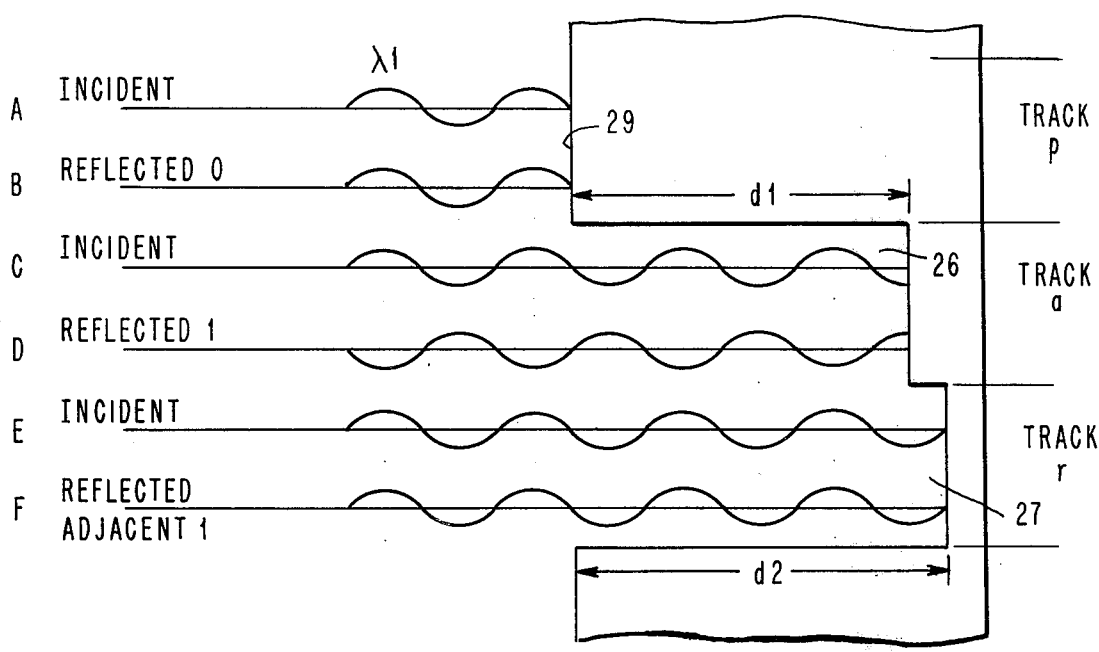
FIG. 3 is a section view of the record of FIG. 2 showing the data representing deformations and illustrating the operation of optically reading one track of the record by interference in light of a wavelength $lambda_1$ that is reflected from the neighborhood of a storage position on the record.

The Data Representing Structure—FIGS. 2 and 3

FIG. 2 shows a perspective view of the record 12. Faint arcuate lines in the drawing identify parts of several adjacent track revolutions that are designated p, q, r and s, and faint radial lines divide the tracks into successive storage positions. The drawing greatly exaggerates the size of a storage position. A storage position can have a deformation such as pits 26 and 27 and a pit will be called a 1 bit (arbitrarily) and the absence of a pit will be called a 0 bit. (As an alternative to the radially aligned storage positions of FIG. 2, the length of the pits or the spacing between pits can be modulated to represent data.) As the drawing shows, the tracks are contiguous without an intervening guardband so that a spot of light illuminates the track being read and parts of one or both of the two adjacent tracks. The pits occupy essentially the full width of the track so that radially adjacent pits may closely approach as the drawing shows or may overlap slightly. Alternatively a small guardband may be located between adjacent tracks.

The pits of tracks q and s have a depth that will be designated $d_1$ that permits these tracks to be read by a light beam of a wavelength $lambda_1$. The adjacent tracks, p and r, have pits of a depth that will be designated $d_2$ that permits these tracks to be read by light of a wavelength $lambda_2$. The read operation uses the phenomenon that the pits cause reflected light to produce destructive interference that causes a pit to appear darker than a storage location that does not contain a pit. The wavelengths and the depths of the pits are selected so that light that is reflected from an adjacent track is independent of whether the adjacent storage location holds a 1 or a 0 bit.

It will be helpful to first review the conventional read operation of pits having a uniform depth, as can be illustrated by pit 26 of track q and the adjacent 0 bit position 29 of track p, which are shown in section view in FIG. 3.

In FIG. 3, sine waveforms on lines A and C show light from source 14 that falls on the surface of record 12 in the neighborhood of pit 26 of track q and a 0 bit of a storage position 29 of adjacent track p which can be considered to represent a conventional guardband. (Track r which is also shown in FIG. 3 will be ignored for this introductory explanation.) Lines B and D show sine waveforms of light that is reflected from the surface of the record and from the bottom of the pit. The light reflected from the surface of the record (line B) is shown as in phase with the incident light of line A. (The phase shift that occurs at a reflecting surface can be ignored since the same shift occurs in all of the reflected waves.) Thus, the disk surface at position 29 appears bright to the light detector 17.

The depth of pit 26, $d_1$, is chosen with respect to the wavelength $lambda_1$ so that light that is reflected from the bottom of the pit travels a half wavelength farther than light reflected from the surface of the disk, and the wave reflected from the bottom of the pit (line D) is one-half wavelength or 180° out of phase with light reflected from the surface of the disk (line B). Thus, light of wavelength $lambda_1$ that is reflected from the neighborhood of a pit of depth $d_1$ produces destructive interference with light from the surface of the record so that a pit appears darker than a storage location that does not contain a pit. More specifically, the depth of the pit is related to the wavelength by equation 1.

$$nd_1 = (i_1\, lambda_1)/4 \qquad (1)$$

The term n is the index of refraction of the material in the pit. In these examples the material is air and n=1, but it is conventional to coat the recording disk with a protective material which may have a different index of refraction. The term $i_1$ is an odd integer. Thus, the depth of the pit can be a quarter wavelength, three-quarters of a wavelength, or either of these values plus a multiple of a half wavelength.

Guard Band Elimination—FIG. 3

From the explanation so far, it can be seen that in a hypothetical operation to read the 0 bit of location 29 of track p with light of wavelength $lambda_1$, interference from the pit 26 of track q would reduce the amount of light received by the detector 17 and, particularly if the read operation had drifted away from the ideal position over track p and toward track q, the detector might read storage position 29 incorrectly as a 1 bit instead of as a 0 bit. In the record of FIG. 3, the pit of adjacent track r has a depth $d_2$ that causes reflected light to have the same phase (or very nearly the same phase) as light that is reflected from the surface of the record. The relationship of the depth $d_2$ to the wavelength $lambda_1$ is shown by equation 2.

$$nd_2 = (j_2\, lambda_1)/2 \qquad (2)$$

The term $j_2$ is a positive integer. Thus, the path of the incident and reflected light within the pit 27 is an integral number of wavelengths, and the light from the bottom of the pit has the same phase as light reflected from the surface of the disk. As FIG. 3 shows, light of wavelength $lambda_1$ from pit 26 interferes equally with light reflected from an adjacent 1 bit or 0 bit.

Lambda 1 And Lambda 2

Figure 4:
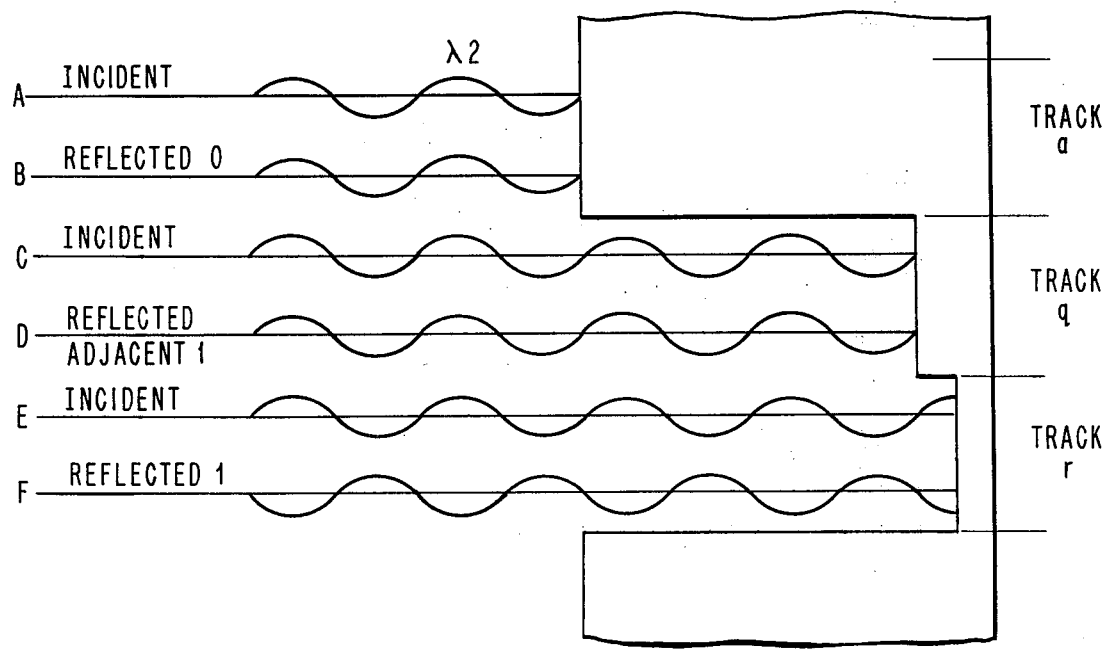
FIG. 4 is a section view of the record as in FIG. 3 with sine waves illustrating the operation of reading a track with light of a wavelength designated $lambda_2$.

As FIG. 4 shows, track r is read with light of a wavelength $lambda_2$. The explanation of the read operation with wavelength $lambda_2$ is similar to the explanation for the read operation with wavelength $lambda_1$ which has already been described. The wavelength $lambda_2$ is related to the pit depths $d_1$ and $d_2$ according to equations 3 and 4.

$$nd_2 = (i_2\ lambda_2)/4 \quad (3)$$

$$nd_1 = (j_1\ lambda_2)/2 \quad (4)$$

The term $j_1$ is a positive integer and the term $i_2$ is an odd positive integer. Equations 1–4 are based on normal light incidence and can be readily modified to account for absorption of light by the record medium.

It can be shown that the four equations that relate the depth of the pits to the two wavelengths do not have a simultaneous solution. (The depths of corresponding pits in FIGS. 3 and 4 have been drawn slightly different to simplify the explanation to this point.) However, approximate numerical solutions exist that are close enough to permit eliminating the guardband. Alternatively, a narrow guardband can be used with other approximate solutions to the equations.

FIGS. 3 and 4 are based on a practical example in which $lambda_1$ equals 805 nanometers and $lambda_2$ equals 900 nanometers. These wavelengths are in the range available from gallium-arsenide injection lasers. (The light source does not have to be a laser; the wave from a non-coherent light source is coherent over the small data storage area represented in FIGS. 3 and 4.) The following tables show the calculations of the pit depth from the four equations.

lambda 1 = 805 nanometers
Equation 1
$d_1 = (i_i/4)\ lambda_1\ i_1 = 9$ $d_i = (9/4)(805) = 1.811$ microns Equation 2
$d_2 = (j_2/2)\ lambda_1\ j_2 = 5$ $d_2 = (5/2)(805) = 2.012$ microns lambda 2 = 900 nanometers
Equation 3
$d_2 = (i_2/4)\ lambda_2\ i_2 = 9$ $d_2 = (9/4)(900) = 2.025$ microns Equation 4
$d_1 = (j_1/2)\ lambda_2\ j_1 = 4$ $d_1 = (4/2)(900) = 1.800$ microns Thus the example provides a practical solution. In general, numerically closer solutions can be found when the values of $i_1$, $i_2$, $j_1$ and $j_2$ are larger.

Records having the physical features described in this section of the specification can be formed by a variety of techniques for mass production or for individual home recording. For example, thermoplastic records can be pressed from a master. The additional components of the player that play the record can now be readily understood.

The Alternate Track Revolution Player—FIG. 1

Light source 14 of the read head 19 is arranged to provide the two frequencies $lambda_1$ and $lambda_2$. Preferably they are provided by two separate light sources, such as two gallium-arsenide lasers or helium-neon lasers, and are selectable in response to control signals on lines 60, 61. Equivalent arrangements of selecting components $lambda_1$ or $lambda_2$ from the beam 15 at detector 17 will be readily understandable.

Preferably, the first source, $lambda_1$, is turned on and the second is turned off while the first set of tracks is read, and conversely the first source is turned off and the second is turned on while the second set of tracks is read. For this construction, the two tracks spiral together and the first set of tracks is read as the read head is moved radially inward (arbitrarily) and the second set is read as the read head is moved radially outward. To begin a record playing operation, a signal called Start is applied to a line 63 to cause the motor 13 to run clockwise (arbitrarily) and the motor 20 to move the read head radially inward. This signal is also applied to line 60 to turn on the light of wavelength $lambda_1$. When the end of the first set of tracks is reached, the signal Start falls and a signal called Continue is raised on a line 64 to cause the motor 13 to begin turning the record counterclockwise and to cause the motor 20 to begin driving the read head radially outward and to cause the light of wavelength $lambda_2$ to turn on. The signal Start can be provided by the normal apparatus for starting a playing operation. The signal Continue can be provided by means such as a line counter, a control message or other special bits on the record, as is conventional for various functions. Alternatively, the track revolution can be read in succession on a single pass of the read head across the record by turning the two light sources on and off to illuminate each track with the appropriate wavelength.

A Light Transmitting Disk

The disk of FIG. 2 can be made of a transparent material and the disk can be read by interference that occurs when a wave is transmitted through the selected storage position and through a pit or the absence of a pit at adjacent storage locations. The index of refraction of common materials for transparent recording disks is somewhat greater than one, the index of refraction of a pit containing air. A wave transmitted through the recording medium is shortened according to the index of refraction and a phase shift occurs between a wave transmitted through the full thickness of the recording medium, a wave transmitted partly through a pit of depth $d_1$, and a wave partly transmitted through a pit of a depth $d_2$. The appropriate phase shifts occur when the pits are constructed with the depths given by the following equations.

$$nd_1 = i_1\ lambda_1/2 \quad (5)$$

$$nd_2 = j_2\ lambda_1 \quad (6)$$

$$nd_2 = i_2\ lambda_2/2 \quad (7)$$

$$nd_1 = j_1\ lambda_2 \quad (8)$$

Equations 5 and 7 define the pit depth for a read operation and equations 6 and 8 define the depth of an adjacent pit to cause light transmitted through an adjacent pit to have the same phase as light transmitted through the full thickness of the disk. The pits can be filled with a protective material having an index different from one and the equations appropriately modified.

Other Embodiments

From the preceding description of preferred recording disks for reading by reflected and transmitted light and a representative playing apparatus, those skilled in the art will recognize variations within the spirit of the invention and the scope of the claims.

We claim:

1. A video disk of the type that is optically readable according to interference or the absence of interference occuring in light from a point being read on a track of the record when the record is illuminated with light of an appropriate wavelength, said disk comprising, first and second sets of track revolutions located on the disk with each track revolution being separated from track revolutions of the same set by a single track revolution of the other set, pits of a depth designated $d_1$ along track revolutions of the first set for producing interference in light of a wavelength designated $lambda_1$ but not in light of a wavelength designated $lambda_2$, pits of a depth designated $d_2$ along track revolutions of the second set for producing interference in light of wavelength $lambda_2$ but not in light of wavelength $lambda_1$, whereby a read operation on track revolutions of the first set with light of wavelength $lambda_1$ and on track revolutions of the second set with light of wavelength $lambda_2$ is independent of the data content of an adjacent track revolution.

2. The video disk of claim 1 wherein the depth of the pits has substantially the following relationship to the wavelengths $lambda_1$ and $lambda_2$, (1) $nd_1 = (i_1\ lambda_1)/4$
   (2) $nd_2 = (j_2\ lambda_1)/2$
   (3) $nd_2 = (i_2\ lambda_2)/4$
   (4) $nd_1 = (j_1\ lambda_2)/2$ where $i_1$ and $i_2$ are odd positive integers, and $j_1$ and $j_2$ are positive integers, and n is the index of refraction within the pit, whereby light reflected from a storage location of an adjacent track revolution containing a pit has the same relative phase relationship as light reflected from an adjacent storage location not containing a pit.

3. The video disk of claim 1 wherein the depth of the pit has substantially the following relationship to wavelengths $lambda_1$ and $lambda_2$ for producing interference in light transmitted through a storage location containing a pit, (5) $nd_1 = i_1\ lambda_1/2$
   (6) $nd_2 = j_2\ lambda_1$
   (7) $nd_2 = i_2\ lambda_2/2$
   (8) $nd_1 = j_1\ lambda_2$ where $i_1$ and $i_2$ are odd positive integers, and $j_1$ and $j_2$ are positive integers, and n is the index of refraction within the pit, whereby light transmitted through a storage location of an adjacent track revolution containing a pit has the same relative phase relationship as light transmitted through an adjacent storage location not containing a pit.

4. The recording disk of claim 1 wherein the first and second sets of track revolutions are formed in two parallel spirals.

5. The recording disk of claim 1 wherein the first and second sets of track revolutions are formed as alternate concentric circles.

6. The recording disk of claim 1 wherein the track revolutions are located closely adjacent substantially without an intervening guardband.

* * * * *